(12) United States Patent  (10) Patent No.: US 7,418,738 B2
Prendergast  (45) Date of Patent: Sep. 2, 2008

(54) VERTICAL ADJUSTMENT MECHANISM FOR HELMET MOUNT FOR NIGHT VISION DEVICE

(75) Inventor: Jonathon R. Prendergast, Newport Beach, CA (US)

(73) Assignee: Norotos, Inc., Santa Ana, CA (US)

( * ) Notice: Subject to any disclaimer, the term of this patent is extended or adjusted under 35 U.S.C. 154(b) by 676 days.

(21) Appl. No.: 11/050,992

(22) Filed: Feb. 4, 2005

(65) Prior Publication Data

US 2006/0174401 A1 Aug. 10, 2006

(51) Int. Cl.
 *A42B 1/24* (2006.01)
(52) U.S. Cl. .................................. 2/22; 2/6.6
(58) Field of Classification Search ............. 2/6.2, 2/6.7, 422, 410, 421
 See application file for complete search history.

(56) References Cited

U.S. PATENT DOCUMENTS

| | | | |
|---|---|---|---|
| 1,226,101 A | 5/1917 | Marsden | |
| 2,284,180 A | 5/1942 | Thomas | |
| 4,449,787 A | 5/1984 | Burbo et al. | |
| 4,553,873 A | 11/1985 | Salice | |
| 4,689,834 A | 9/1987 | McCarthy et al. | |
| 4,697,783 A | 10/1987 | Kastendieck et al. | |
| 4,987,608 A | 1/1991 | Cobb | |
| 5,176,342 A | 1/1993 | Schmidt et al. | |
| 5,179,735 A | 1/1993 | Thomanek | |
| 5,226,181 A | 7/1993 | Polednak et al. | |
| 5,331,684 A | 7/1994 | Baril et al. | |
| 5,339,464 A | 8/1994 | Dor | |
| 5,347,119 A | 9/1994 | Connors | |
| 5,408,086 A | 4/1995 | Morris et al. | |
| 5,467,479 A | 11/1995 | Mattes | |
| 5,469,578 A | 11/1995 | Mattes | |
| 5,471,678 A | 12/1995 | Dor | |
| 5,506,730 A | 4/1996 | Morley et al. | |
| 5,542,627 A | 8/1996 | Crenshaw et al. | |
| 5,581,806 A | 12/1996 | Capdepuy et al. | |
| 5,648,862 A | 7/1997 | Owen | |
| 5,703,354 A | 12/1997 | Wannagot et al. | |
| 5,914,816 A | 6/1999 | Soto et al. | |
| 6,457,179 B1 | 10/2002 | Prendergast | |
| 6,462,894 B1 * | 10/2002 | Moody | 359/815 |
| 6,472,776 B1 | 10/2002 | Soto et al. | |
| 6,606,114 B1 * | 8/2003 | Gordon et al. | 348/64 |
| 6,957,449 B2 * | 10/2005 | Prendergast | 2/422 |
| 7,219,370 B1 * | 5/2007 | Teetzel et al. | 2/6.2 |

* cited by examiner

*Primary Examiner*—Danny Worrell
(74) *Attorney, Agent, or Firm*—Christie, Parker & Hale, LLP.

(57) ABSTRACT

A helmet mount includes a helmet block, a chassis attached to the helmet block, the chassis adapted to receive the night vision device, and a vertical adjustment assembly for vertically adjusting a night vision device relative to a user's eyes while the helmet mount is secured to the helmet and the night vision device is received in the helmet mount. The vertical adjustment assembly includes a front and back plate that are slidably connected, wherein the front plate is coupled to the chassis and the back plate is coupled to the helmet mount, and a gear drive system. Rotating a lever on the gear drive system rotates the gear so that the vertical position of the chassis is changed relative to the helmet block. The gear driven system further includes at least one biasing means placed between the front plate and the back plate and may include a tapered shaft.

16 Claims, 9 Drawing Sheets

VERTICAL ADJUSTMENT MECHANISM FOR HELMET MOUNT FOR NIGHT VISION DEVICE

FIELD OF THE INVENTION

This invention relates generally to mounting assemblies for night vision devices, and more particularly to a vertical adjustment mechanism for a mounting assembly for night vision goggles.

BACKGROUND OF THE INVENTION

Night vision devices are commonly used by military personnel for conducting operations in low light or night conditions. The night vision devices utilized by the military typically include image intensifier tubes and associated optics that convert infrared and near infrared light into viewable images. Common night vision devices currently being used in the U.S. Army include the PVS7, PVS14, PVS 15, PVS18, PVS21 and PVS23.

Assemblies for mounting night vision devices to a helmet are well known in the art. These mounting assemblies allow a user's hands to remain free while viewing a scene through the night vision device. Prior art mounting assemblies typically include one or more of the following features: positional adjustment of the night vision device between a use and stowed position; tilt angle adjustment of the night vision device relative to the user's eyes; focal adjustment of the location of the night vision device relative to the user's eyes; and automatic shutdown of the night vision device when not in the use position.

Because of the large number of features incorporated into known flip-up helmet mounts, there are areas for improvement upon the known helmet mounts. One area that can be improved is the vertical adjustment mechanism, which currently may be vulnerable to moving out of a desired position if the night vision device is jolted or exposed to intense vibration, such as when a user runs with the device attached to a helmet. Additionally, the vertical adjustment mechanism may be susceptible to foreign particles.

SUMMARY OF THE INVENTION

One exemplary embodiment of the present invention includes a helmet mount for a night vision d device. The helmet mount includes a helmet block, a chassis attached to the helmet block, the chassis adapted to receive the night vision device, and a vertical adjustment assembly for vertically adjusting the night vision device relative to the user's eyes while the helmet mount is secured to the helmet and the night vision device is received in the helmet mount. The vertical adjustment assembly includes a front plate and a back plate that are slidably connected, wherein the front plate is coupled to the chassis and the back plate is coupled to the helmet mount, and a gear drive system having a lever positioned adjacent to a front surface of the front plate and a gear positioned within a back surface of the back plate. Rotating the lever on the gear drive system rotates the gear so that the vertical position of the chassis is changed relative to the helmet block. The gear driven system further includes at least one biasing means placed between the front plate and the back plate. In another exemplary embodiment, the gear drive system may include a tapered shaft. The front and back plates may be slidably connected by a double dovetail interface, the double dovetail interface having sidewalls angled at about 15 degrees from the vertical. Additionally, the helmet mount may include a sliding cover plate which is slidably connected to the front and back plates to prevent foreign objects from entering the gear drive system.

BRIEF DESCRIPTION OF THE DRAWINGS

FIG. 10a is a front cross-sectional view of the sliding cover plate of FIG. 9a.

DETAILED DESCRIPTION

Figure 1:
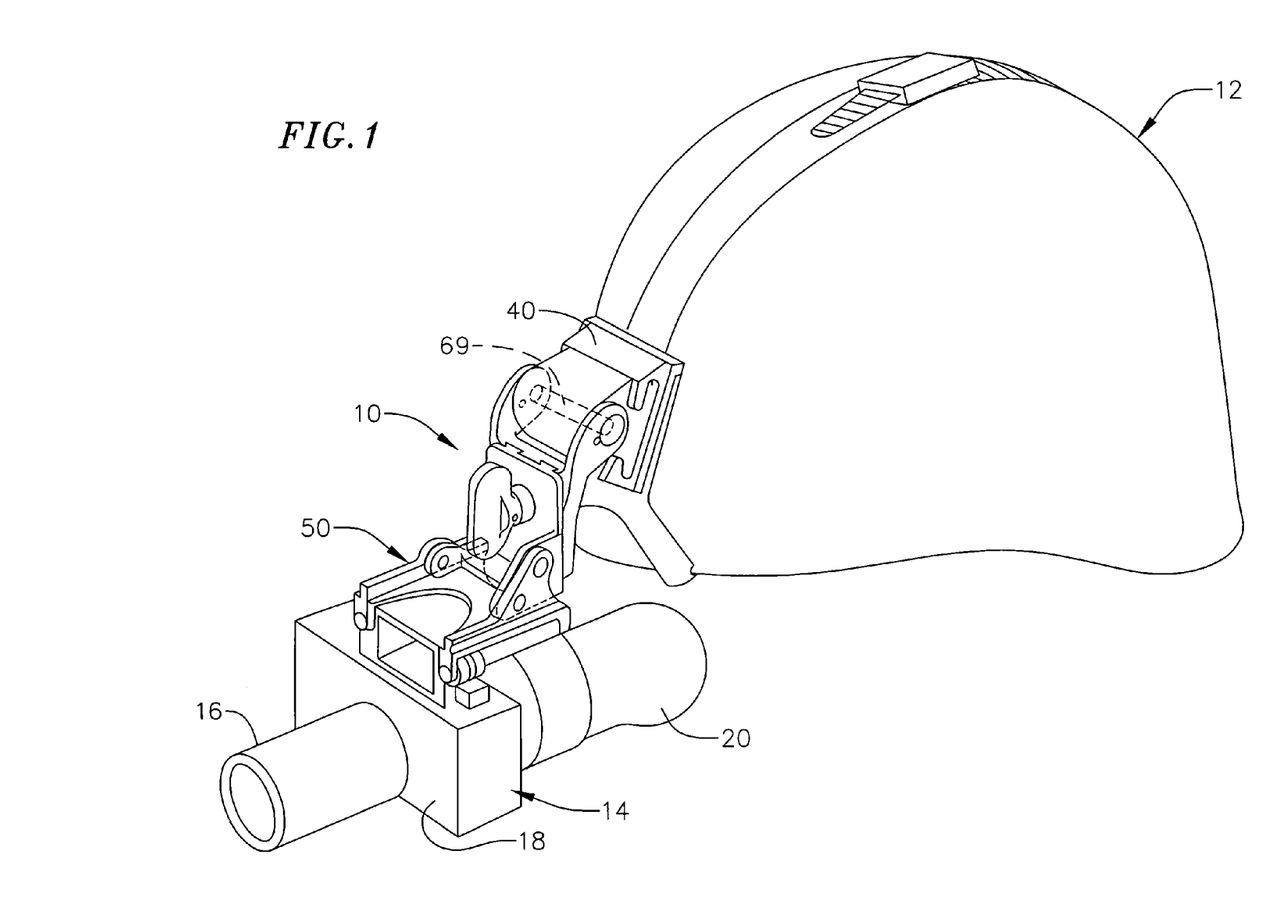
FIG. 1 is a perspective schematic view of the flip-up helmet mount provided for in the present invention secured to a helmet, wherein the night vision device is in the use position.

Referring now to FIG. 1, a schematic view of an exemplary embodiment of a flip-up helmet mount 10 according to the present invention is shown. The flip-up helmet mount 10 is shown in use with a standard U.S. Army Kevlar composite helmet 12. The flip-up helmet mount may be attached to the helmet by a helmet block 40. A night vision device 14 is secured to the helmet 12 by use of the flip-up helmet mount 10. The night vision device 14 shown in FIG. 1 is a device that includes a single objective lens 16, a housing 18, and a pair of eye pieces 20. The night vision device may be attached to the helmet mount by a chassis 50 mounted to a rack system. To use the night vision device 14, the operator places it in the position depicted in FIG. 1 and looks into the eye pieces 20 to see an enhanced image representative of the low-level light from a night scene which has entered the objective lens 16. Some of the embodiments disclosed herein are related to those found in U.S. Pat. No. 6,547,179, the subject matter of which is hereby incorporated by reference.

As shown FIG. 1, the night vision device 14 is positioned to be in front of the operator's eyes so that the operator may look through the eye pieces 20 of the night vision device. This position will be referred to as the "use" position. However, the flip-up mount also allows the operator to rotate the assembly 10 around a shaft 70, allowing the operator to stow the night vision device 14 completely above the line of sight of the operator, to permit normal, unobstructed vision. This position will be referred to as the "stowed" position.

Figure 4:
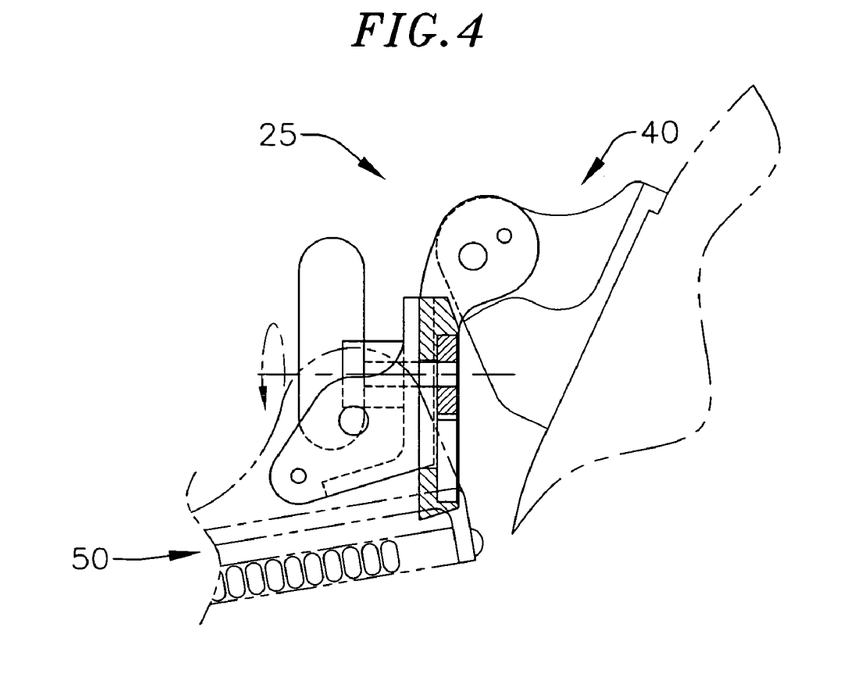
FIG. 4 is a partial cross-sectional side view of a vertical adjustment mechanism in an up position cut along its central axis.
Figure 5:
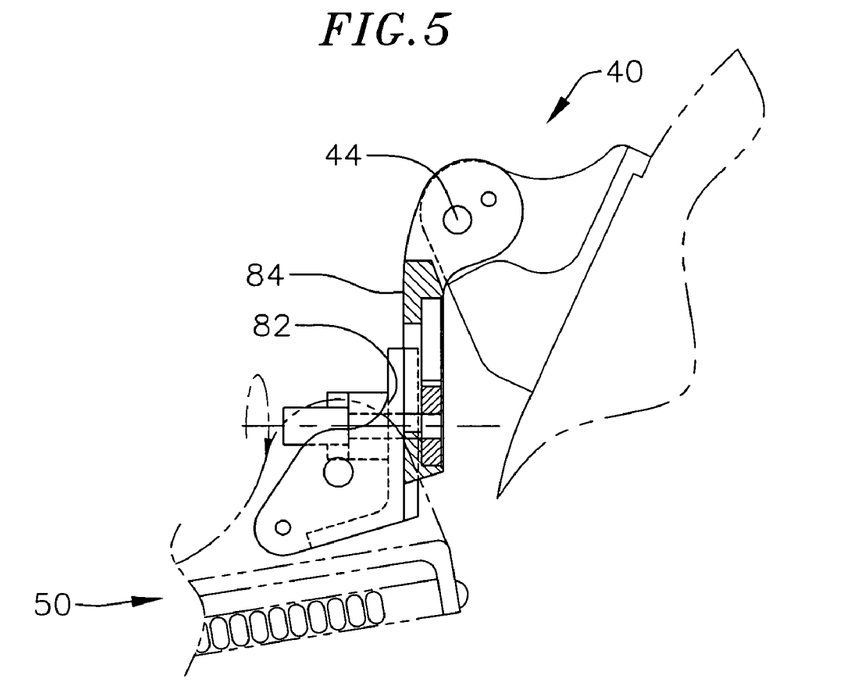
FIG. 5 is a partial cross-sectional side view of the vertical adjustment mechanism in a down position cut along its central axis.

The flip-up helmet mount 10 allows for vertical adjustment of the night vision device 14 relative to the user's eyes. In one exemplary embodiment shown in FIGS. 2 and 3, a gear drive mechanism 21 is provided to allow vertical adjustment of the chassis 50 (FIG. 1). In describing the vertical adjustment achieved by the gear drive mechanism 21 as shown in FIGS. 4 and 5, the helmet block 40 will be considered proximal to the gear drive mechanism 21 and the chassis 50 will be considered distal to the gear drive mechanism. Moreover, vertical movement in the proximal direction (i.e. towards the helmet block 40) will be considered "up," while vertical movement in the distal direction (i.e. towards the helmet chassis 50) will be considered "down." Accordingly, FIG. 4 shows the gear drive mechanism 21 in the up position, while FIG. 5 shows the gear drive mechanism in the down position.

The gear drive mechanism 21 comprises an assembly 25 that attaches to the helmet block 40. The assembly 25 has a front plate 22 and a back plate 30 (see FIGS. 2 and 3). When the gear drive mechanism 21 is incorporated into a fully assembled helmet mount 10, the front plate 22 and the back plate 30 are slidably connected to each other, while the back plate is rotatably coupled to the helmet block 40 and the front plate is adjustably coupled to the chassis 50.

Figure 2:
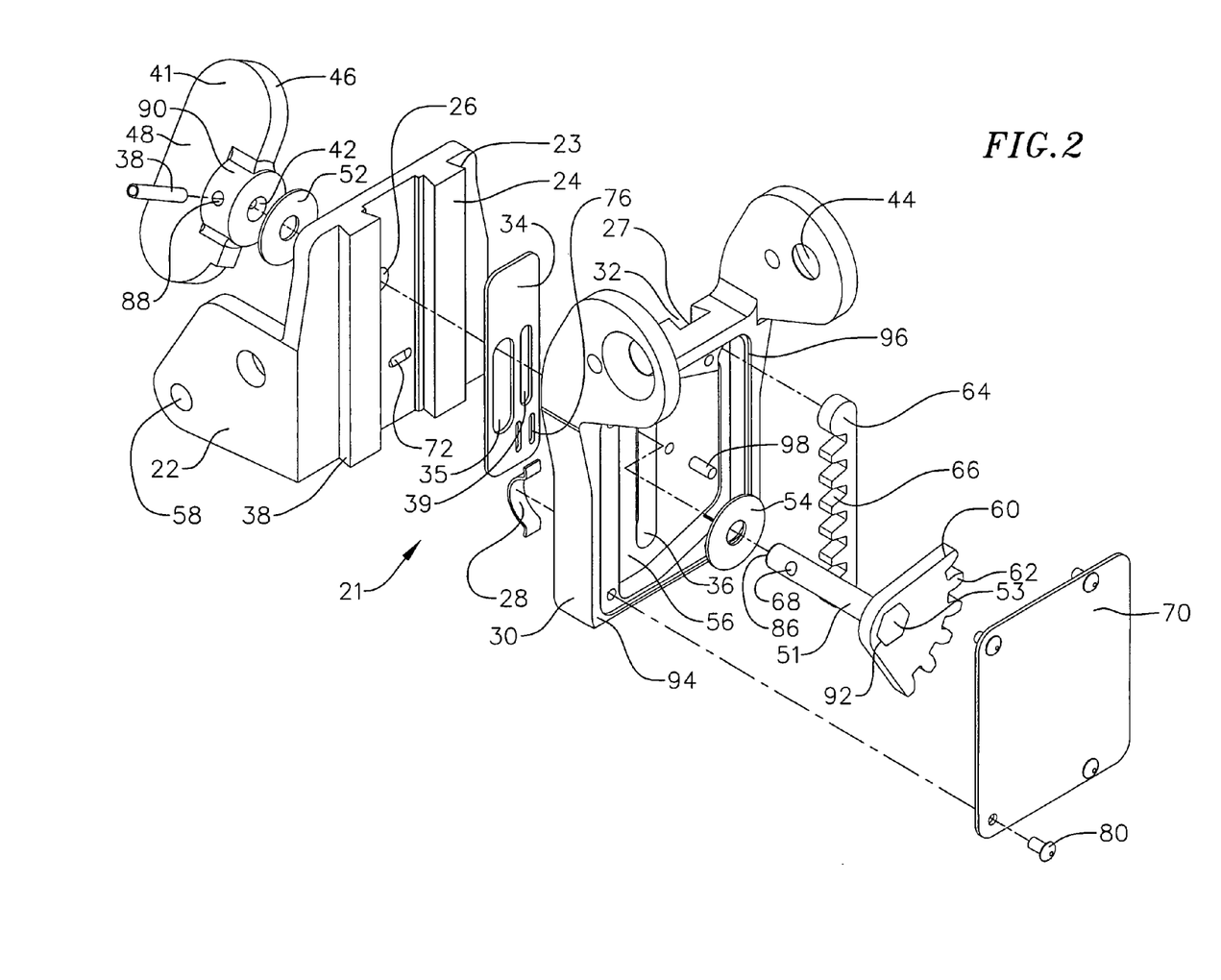
FIG. 2 is an exploded perspective view of a vertical adjustment mechanism of the present invention.
Figure 3:
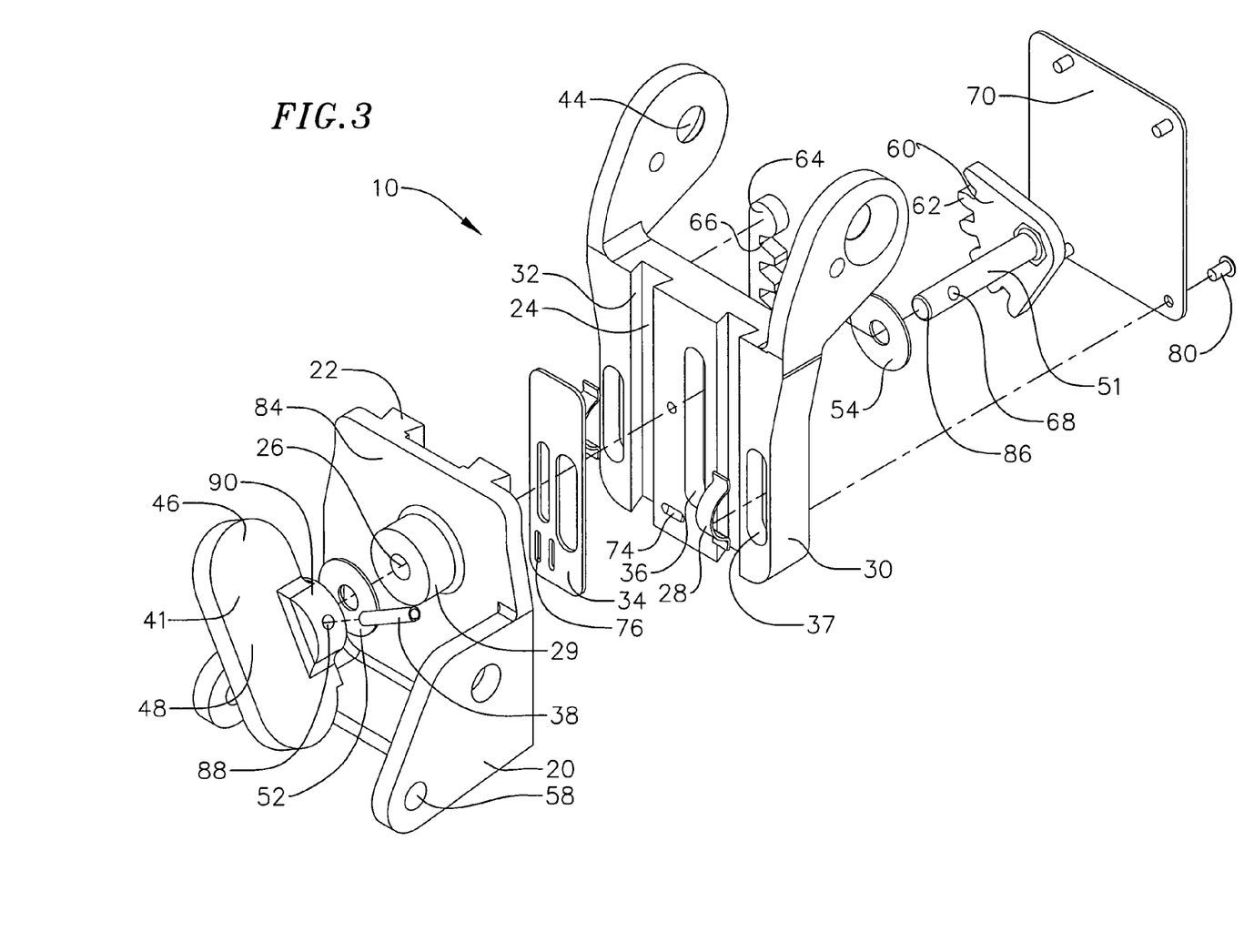
FIG. 3 is an alternate exploded perspective view of the vertical adjustment mechanism of FIG. 2.

As can be seen in FIGS. 2 and 3, the front plate 22 and the back plate 30 of the assembly 25 are connected in a dovetail type interface. In one exemplary embodiment, the connection is a double dovetail type interface. Specifically, the front plate 22 and the back plate 30 are slidably engaged by aligning a pair of parallel protruding ridges 23 extending vertically across an engaging surface 24 of the front plate with a pair of recesses 32 that have been machined into an engaging surface 27 of the back plate. Dovetail alignment of the protruding ridges 23 of the front plate 22 with the recesses 32 of the back plate 30 engages the front and back plates in such a way that the plates of the assembly 25 only move relative to one another by precisely sliding vertically up and down.

While slidability between the front plate 22 and the back plate 30 is desirable, there should also be enough friction between the plates to prevent movement between them until the desired time. In one exemplary embodiment of the present invention, the front and back plates 22, 30 are held in tension to prevent unnecessary and undesired movement between them. As such, a pair of leaf springs 28 may be used to aid in maintaining tension between the ridges 23 and recesses 32 of the dovetail assembly. The leaf springs 28 may be housed in leaf spring recesses 37 on a front surface 84 of the back plate 30. Other biasing means for maintaining tension may be used. For example, coil springs may be used in place of leaf springs. In one exemplary embodiment, the leaf springs 28 may be made from full hard stainless steel and beryllium copper. Other resilient materials may also be used with harder materials providing a higher spring rate than softer materials when all other elements are equal. The leaf springs 28 preferably have a width between about 0.095" and 0.115", with wider leaf springs providing a higher spring rate than narrower springs when all other elements are equal. The leaf springs 28 preferably have a thickness of between about 0.012" and 0.015", with thicker springs providing a higher spring rate than thinner springs when all other elements are equal. As will be apparent to those of skill in the art, leaf springs 28 of varying widths, thicknesses and materials may be used depending on the amount of tension desired.

Additionally, it has been found that the angle of a side wall 31 of the ridges 23 affects the amount of force needed to overcome the friction of the dovetail arrangement. Thus, in one exemplary embodiment, the angle of the side walls 31 is about 15 degrees from the vertical. Additionally, the angle of the side walls 31 may vary about 10 degrees in either direction, where increasing the angle will reduce the locking effect of the tapers and decreasing the angle will enhance the locking effect of the tapers.

The back plate 30 is coupled to the helmet block 40 by passing a cylindrical shaft 69 through a pair of apertures 44 in a proximal end of the back plate 30. The shaft is received by a transverse bore (not shown) of the helmet block 40, thereby coupling the back plate to the helmet block. The back plate 30 is still rotatably coupled to the helmet block 40 so as to allow the night vision device to be moved from either a stowed or use position.

The front plate 22 may be connected to the chassis 50 is such a way that allows for tilt adjustment of the chassis. For example, the front plate 22 may be coupled to the chassis 50 through a pair of apertures 58 through which a shaft (not shown) may be passed.

Once the back plate 30 has been coupled to the helmet block 40 and the front plate 22 has been coupled to the chassis 50, and the front plate and back plate are slidably engaged by dovetail alignment of their respective ridges 23 and recesses 32, the assembly 25 provides adjustable movement between the helmet block and the chassis. Normally, the helmet block 40 is considered to be fixed or stationary, as when it is mounted to a helmet 12. Therefore, when the night vision device 14 is in the use position, as opposed to the stowed position, the back plate 30 is normally considered stationary for purposes of the vertical adjustment of the night vision device with respect to the user's eyes. Consequently, the vertical adjustment of the night vision device 14 is accomplished by vertical movement of the front plate 22, which is coupled to the chassis 50 and in turn to the night vision device. Therefore, the front plate 22 moves up and down while it is slidably engaged with the relatively stationary back plate 30.

As shown in FIGS. 2 and 3, the gear drive mechanism 21 comprises an assembly 25 having a front plate 22 and a back plate 30 that are slidably engaged in a dovetail interface, a lever 41, a cylindrical shaft 51, and a partially toothed gear 60. As shown in FIG. 3, the front plate 22 in one exemplary embodiment has an integral bushing 29 machined onto a front surface 84 of the front plate. The integral bushing 29 has an aperture 26 through its center that extends through the front plate 22. The shaft 51 is horizontally disposed through the aperture 26 in the integral bushing 29 and the front plate 22, and extends through an elongated aperture 36 in the back plate 30. A washer 52 may be placed between the lever 41 and the bushing 29 to facilitate rotation of the lever.

When the shaft 51 is disposed in the front plate 22, a shaft tip 86 extends from the integral bushing 29 of the front plate 22 and is adapted to fit into a bore 42 in the lever 41. When the shaft 51 is inserted into the bore 42 on the lever 41, a through hole 68 on the shaft 51 aligns with a through hole 88 in the lever. A pin 38 is then inserted into both through holes 68, 88 to fixedly couple the lever 41 to the shaft 51. Additionally, the shaft 51 may be inserted through a washer 54 placed between the gear 60 and a back surface 94 of the back plate 30 to facilitate rotation of the gear drive mechanism 21.

The lever 41 has a domed portion 90 surrounding the bore 42. The outer surface of the domed portion 90 transitions into a transverse wing member 46 with opposed gripping surfaces 48. In one exemplary embodiment, the wing member 46 extends a greater distance to one side of the dome portion 90 so that the gripping surfaces 48 may be more easily manipulated to rotate the shaft 51 about its central axis.

As further shown in FIG. 2, a back surface 94 of the back plate 30 has a gear housing 56 that is adapted to retain the gear 60. The gear housing 56 is a recess in the back plate 30 that, unlike the elongated aperture 36, does not extend through the back plate as an aperture. The perimeter of the elongated aperture 36 is a base or floor of the gear housing 39 on which the gear 60 rests. The gear 60 is shaped generally like a pie wedge having a non-circular, in this exemplary embodiment—hexagonal, through hole 92 into which a corresponding end 53 of the shaft 51 is adapted to fit. Thus, the gear 60 is fixed relative to the shaft 51 and will rotate with it. The gear 60 further includes a plurality of teeth 62 that protrude outwardly from the perimeter. The teeth 62 are adapted to engage a plurality of grooves 66 mounted on a rack 64 fixedly attached to the gear housing 56. In one exemplary embodiment, the back surface 94 of the back plate 30 has a thin recess 96 that surrounds the perimeter of the gear housing 56 and has a more shallow depth than the gear housing so that a cover plate 70 may be placed over the gear housing to prevent debris or other objects from entering the gear housing and thereby obstructing the movement of the gear 60. The cover plate 70 may be secured to the back plate 30 by rivets 80 or by any other suitable attachment means.

The through hole 92 of the gear 60 allows the shaft end 53 to be forcibly inserted therein to create an interference fit and fixedly couple the gear 60 to the shaft 51. When the gear 60 and shaft 51 are coupled, the gear 60 may be rotated to move up and down within the gear housing 56, through engagement of the teeth 61 with the grooves 66, by rotating the lever 41, which is also coupled to the shaft. In one exemplary embodiment, the gear 60 will have a rotational range of approximately 120 degrees and vertical travel of approximately 0.6 inches.

When the gear drive mechanism 21 is rotated so that the front plate 22 is at either extreme position, i.e. all the way up or all the way down, the elongated aperture 36 may become uncovered by movement of the front plate 22 past an end of the aperture. This exposure of the elongated aperture 36 may allow sand, dirt or other undesirable foreign objects to infiltrate the gear drive mechanism 21, hindering its movement capability and/or damaging its components. To prevent such foreign objects from entering the gear drive mechanism 21, a sliding cover plate 34 is disposed between the two protruding ridges 23 of the front plate 22. The sliding cover plate 34 is generally rectangularly shaped and has two apertures, a shaft aperture 35 and a peg aperture 39, and an "S" shaped detent 76. The shaft 51 is disposed through the shaft aperture 35 and a peg 98 protruding from a distal surface of the back plate 30 is disposed through the peg aperture 39.

Figure 9A:
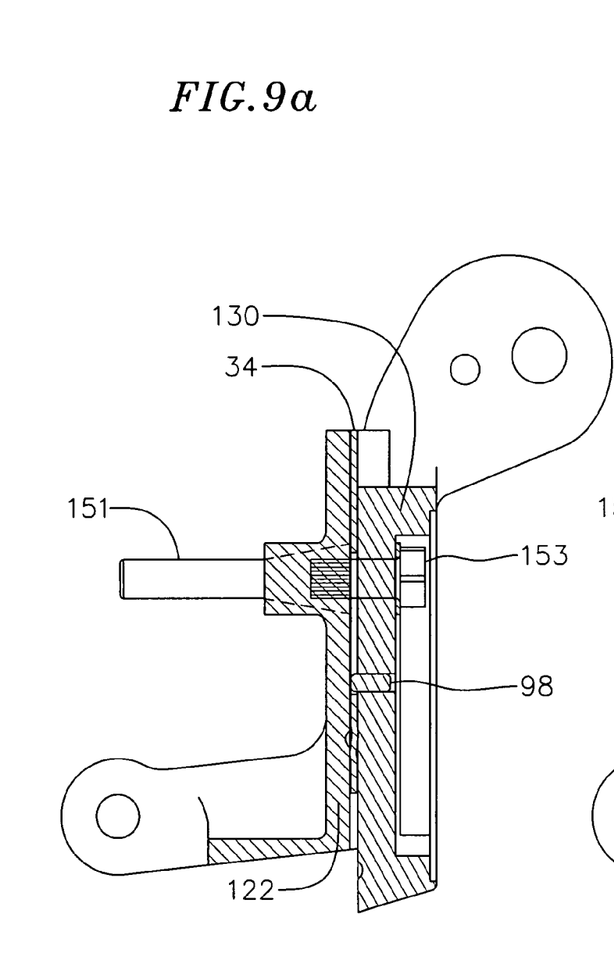
FIG. 9a is an exploded partial cross-sectional view of a sliding cover plate between a front plate and a back plate of an embodiment of a vertical adjustment mechanism of the present invention wherein the vertical adjustment mechanism is in the up position.
Figure 9B:
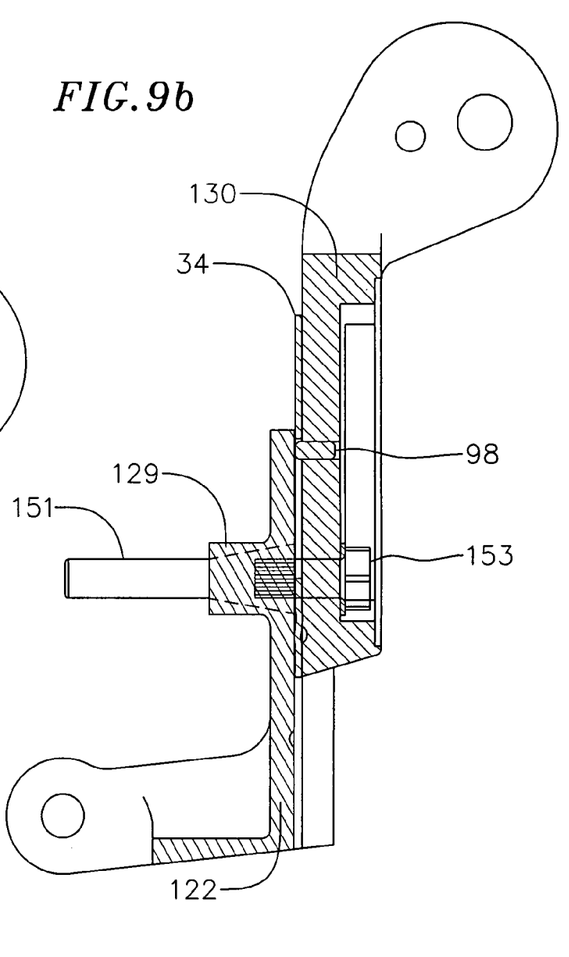
FIG. 9b is an exploded partial cross-sectional view of a sliding cover plate between a front plate and a back plate of an embodiment of a vertical adjustment mechanism of the present invention wherein the vertical adjustment mechanism is in the down position.
Figure 10A:
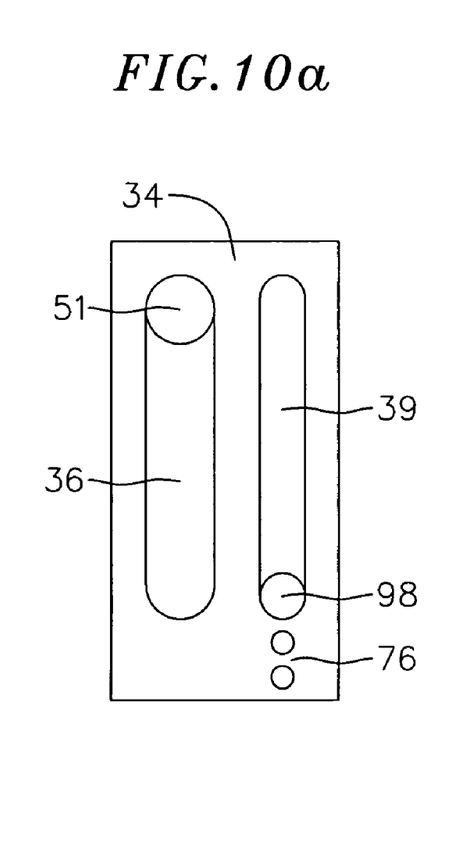

The sliding cover plate operates as follows. As shown in FIGS. 9a through 10b, when the gear drive mechanism 21 rotates such that the front plate 22 moves up, the shaft 51 will, if the gear 60 is rotated far enough, reach the top of the shaft aperture 35. When the shaft 51 reaches the top of the shaft aperture 35, the sliding cover plate 34 will move upwards with the front plate 22 until the bottom of the peg aperture 39 reaches peg 98, as shown in FIG. 10a. Once the mechanism has reached this position, the front plate 22 will be prevented from moving any further upward with respect to the back plate 30. In this position, the bottom part of the cover plate 34 covers any exposed portion of the elongated aperture 36 and prevents any foreign material from entering the gear drive mechanism 21. The peg 98 also prevents the sliding cover plate 34 from sliding upward past the top of the front plate 22 which may expose the elongated aperture 36 to foreign objects, and may also subject the plate to damage from an impact.

Figures 10B, 11:
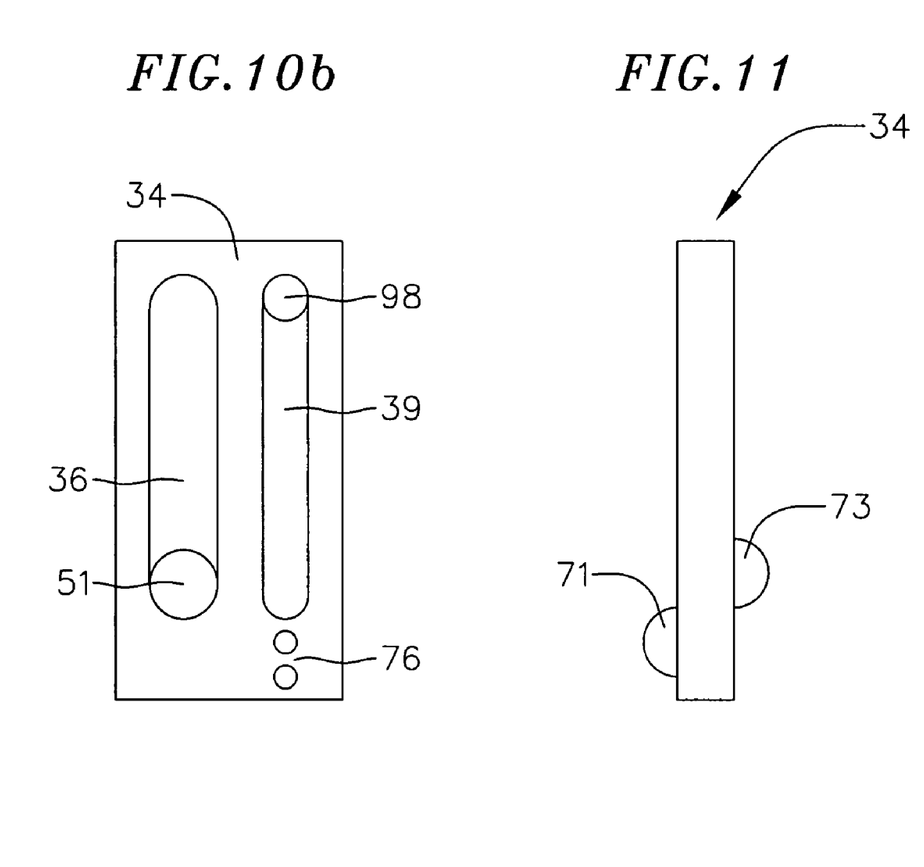
FIG. 10b is a front cross-sectional view of the sliding cover plate of FIG. 9b.
FIG. 11 is a schematic side view of the sliding cover plate of FIGS. 9a and 9b.

The s-shaped detent 76 is provided in the sliding cover plate 34 to control the movement of the plate. As shown in FIG. 9a, when the front plate 22 is in the up position, a front section 71 of the s-shaped detent 76 will engage a front plate notch 72 (FIG. 2) located in between the protruding ridges 23 on the front plate. This engagement will cause the sliding cover plate 34 to travel with the front plate 22 when the front plate is traveling down towards the down position as shown in FIG. 9b. During this travel downwards the pin 98 will eventually encounter an end of the slot 39 in the sliding cover plate 34 as shown in FIG. 10b. The pin 98 will now prevent the sliding cover plate 34 from traveling any father downward. As the front plate 22 continues downwards the front section 71 of the s-shaped detent 76 will disengage from the front plate notch 72. When the front plate 22 reaches the down position, a back section 73 of the s-shaped detent 76 will engage a back plate notch 74 (FIG. 3) located on the back plate 30 between the two engaging surfaces 24. This engagement causes the sliding cover plate 34 to remain stationary with the back plate 30 as the front plate 22 travels upwards. During this travel upwards, the shaft 51 will eventually find an opposite end of the slot 35 in the sliding cover plate 34 as shown in FIG. 10a. As the front plate 22 continues upwards the back section 73 of the s-shaped detent 76 will disengage from the back plate notch 74 in the back plate 30 and the sliding cover plate 34 will travel upwards with the front plate 22 until it reaches the up position.

A user of the night vision device may adjust the vertical placement of the night vision device by gripping and turning the opposed gripping surfaces 48 of the lever 41 mounted to the front plate 22, which in turn rotates the shaft 51 coupled to the gear 60. When the shaft 51 rotates, the gear 60 rotates which causes the teeth 62 of the gear to engage the grooves 66 of the gear housing 56. This engagement causes the gear 60 to move up and down within the gear housing 56. Therefore, the up and down movement of the gear 60 within the gear housing 56 means that the vertical position of the front plate 22, the chassis 50 and the night vision device are all adjusted when the user turns the lever 41. This allows for a wide range of vertical positions available for the user to select by rotating the lever 41.

In one exemplary embodiment, the gear 60 has six teeth 62 while the gear housing 56 has six grooves 66. A lubricant, such as an oil, may be placed within the gear housing 56 to facilitate a fluid movement of the gear 60 with the gear housing when the lever 41 is rotated. As described in more detail above, enough friction, however, should be provided between the gear 60 and the gear housing 62 to prevent inadvertent movement and undesired change in vertical position of the night vision device due to ordinary use forces applied to the night vision device, such as those encountered when a user jumps or runs. In one exemplary embodiment, the gear 60 is made from a 6/6 nylon, but it may also be made from any other suitable material such as a metal, e.g. bronze, brass, stainless steel or alloys thereof, or possibly another plastic that has a sufficient shear strength to prevent the teeth from breaking off when the night vision device is jolted or bumped. In addition, the materials used to make each of the parts, as well as their sizing, may be varied while still achieving the intended purpose. In one exemplary embodiment, the parts of the gear drive mechanism 21 are made from aluminum, except for the nylon gear and the shaft, which is made from a 300 series stainless steel.

Figure 6:
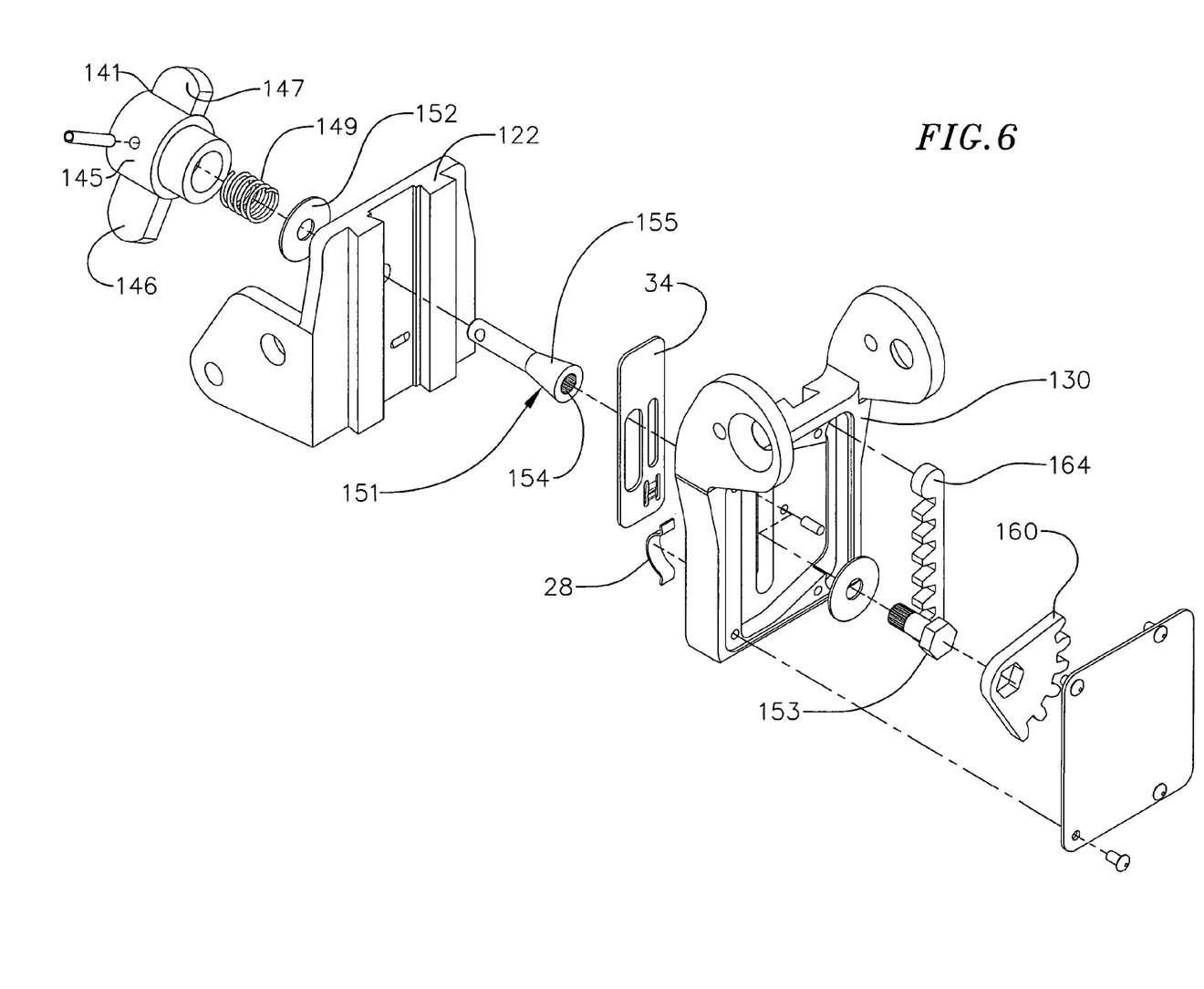
FIG. 6 is an exploded perspective view of alternate embodiment of a vertical adjustment mechanism of the present invention.
Figure 7:
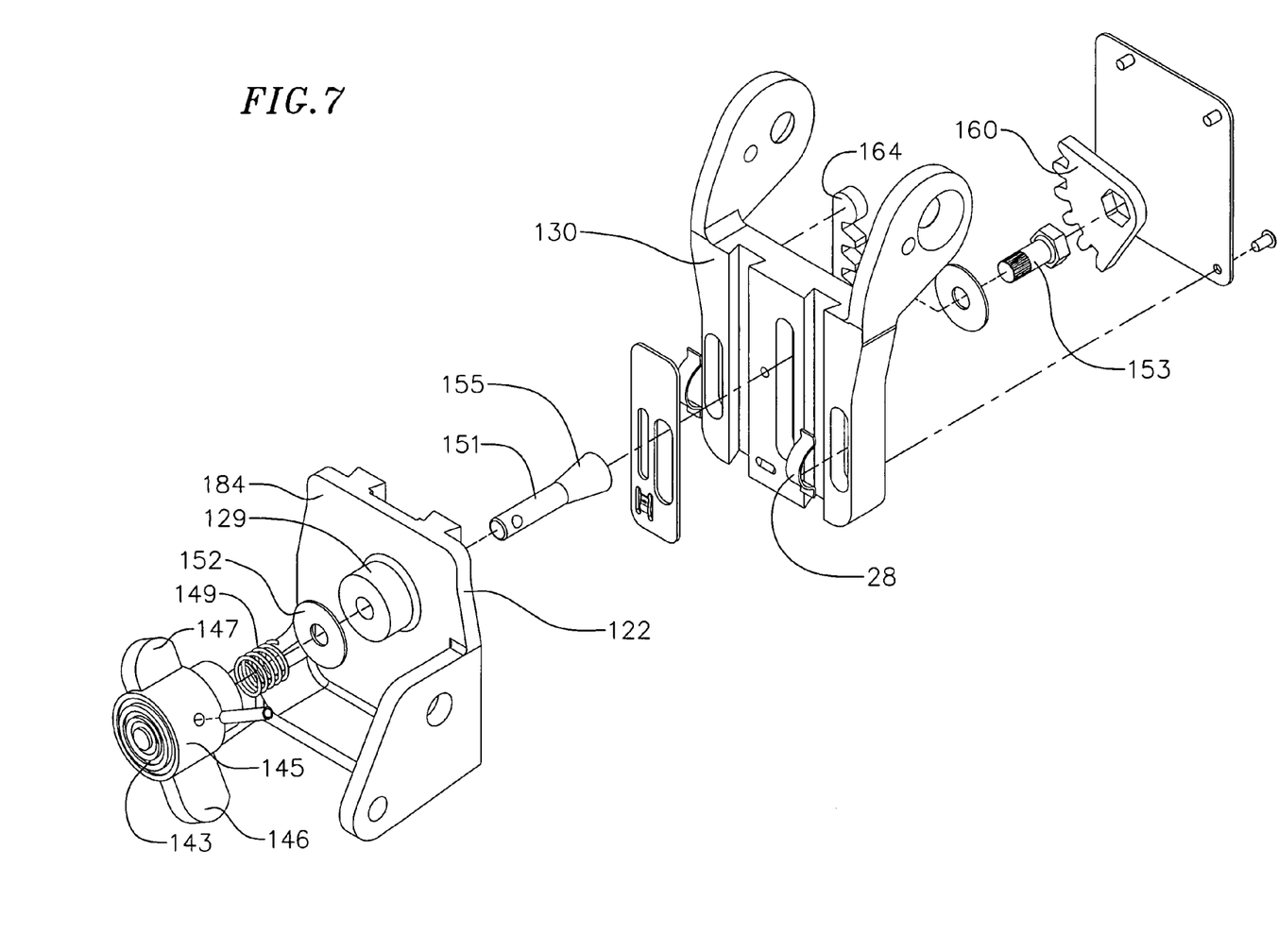
FIG. 7 is an alternate exploded perspective view of the alternate embodiment of FIG. 6 of a vertical adjustment mechanism of the present invention.

FIGS. 6 and 7 illustrate an alternate embodiment of a vertical adjustment mechanism of the present invention. Many of the features and concepts of the previously described embodiments are the same and are relevant to the presently described embodiment. Particularly, this embodiment also uses a rack 164 having a front plate 122 and a back plate 130 that are substantially similar to the rack 64 used in the previous embodiment.

The connections between the front plate 122 and the helmet block, and the back plate 130 and the chassis 50 are also the same as described above for the previous embodiment, and therefore are not described again in detail. Moreover, the parameters discussed above for determining movement and direction are the same for this embodiment.

Figure 8:
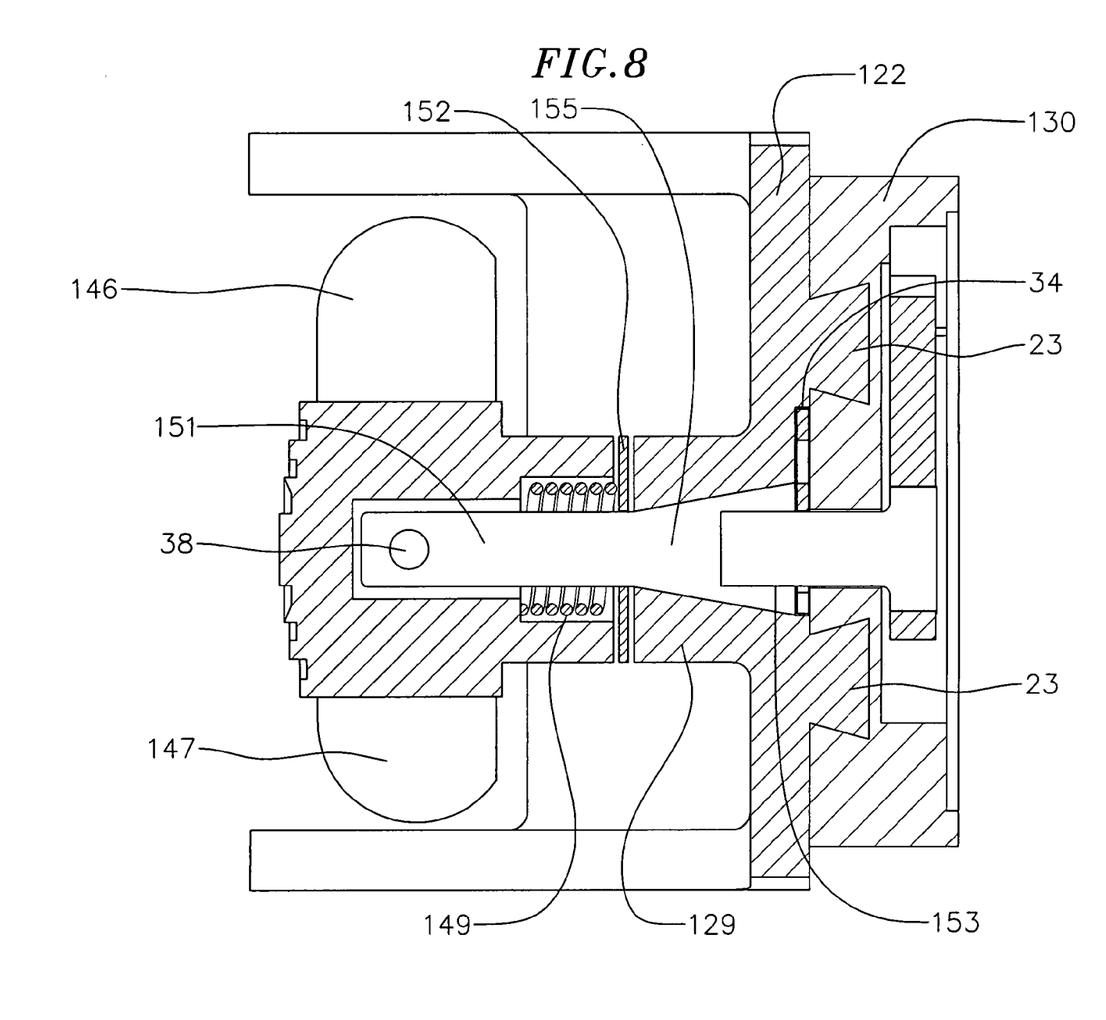
FIG. 8 is a partial cross-sectional side view of an alternate embodiment of a vertical adjustment mechanism of the present invention.

As shown in FIGS. 6 and 7, the gear drive mechanism comprises a rack 164 having a front plate 122 and a back plate 130 that are slidably engaged in a dovetail interface, a lever 141, a tapered shaft 151, and a partially-toothed gear 160. The shaft 151 is not tapered along its entire length, but rather has a tapered portion 155 as shown in FIG. 8. Additionally, the tapered portion 155 of the shaft 151 includes a recess 154 which is adapted to receive a shaft insert 153 (see also FIG. 8). The connection between the shaft 151 and the shaft insert 153 may be an interference fit, or may include some other connection, such as a screw-type for example. By having a head insertable into a hole in the gear 160, the shaft insert 153 serves to fixedly couple the shaft to the gear 160, allowing rotation of the shaft to translate to rotation of the gear.

As described with respect to the previous embodiment, the front plate 122 has an integral bushing 129 machined onto a front surface 184 of the front plate. As shown in FIG. 8, the integral bushing 129 is adapted to receive the tapered portion 155 of the shaft 151. In one exemplary embodiment, the inner circumference of the bushing 129 is shaped such that it is complementary to the tapered shape of the shaft 151. As further illustrated in FIG. 8, a washer 152 is placed adjacent to the proximal side of the bushing 129 and a coil spring 149 is disposed between the washer 152 and the lever 141. The tapered portion of the shaft 151 and the complementary tapering of the bushing 129 allow for a more secure fit between the two components when they are in tension.

The alternate embodiment further includes a lever 141 having a stepped cylindrical body portion 145 flanked by wing members 146, 147. Wing member 146 extends a greater distance to once side of the body 145 so that the lever 141 may be more easily manipulated to rotate the shaft 151 about its central axis. The stepped cylindrical body 145 of the lever 141 is adapted to receive the coil spring 149. Of course, other types of biasing means could be used in place of the coil spring.

The present embodiment may be operated as follows. Pushing the lever 141 in the proximal direction compresses the coil spring 149, thereby releasing some of the tension between the front plate 122 and the back plate 130. The release of tension between the plates 122, 130 allows an operator to more easily rotate the lever 141 to move the plates relative to one another, and further reduces wear on the gear drive mechanism 121. An outer surface 143 of the lever 141 may be textured to provide better gripping for the push button lever.

Although embodiments of the present invention have been described for illustrative purposes, those skilled in the art will appreciate that various modifications, additions and substitutions are possible without departing from the scope and spirit of the invention as disclosed in the accompanying claims.

What is claimed is:

1. A helmet mount for a night vision device comprising:
   a helmet block;
   a chassis attached to the helmet block, the chassis adapted to receive the night vision device; and
   a vertical adjustment assembly for vertically adjusting the night vision device relative to the user's eyes while the helmet mount is secured to the helmet and the night vision device is received in the helmet mount, the vertical adjustment assembly including:
      a front plate and a back plate that are slidably connected, wherein the front plate is coupled to the chassis and the back plate is coupled to the helmet mount; and
      a gear drive system having a lever positioned adjacent to a front surface of the front plate and a gear positioned within a back surface of the back plate, wherein rotating the lever rotates the gear so that the vertical position of the chassis is changed relative to the helmet block;
      the gear driven system further comprising at least one biasing means placed between the front plate and the back plate.

2. The helmet mount as in claim 1, wherein the at least one biasing means is a leaf spring.

3. The helmet mount as in claim 1, wherein there are two biasing means.

4. The helmet mount as in claim 2, wherein the leaf spring is made from stainless steel and beryllium copper.

5. The helmet mount as in claim 4, wherein the stainless steel is full hard stainless steel.

6. The helmet mount as in claim 2, wherein the leaf spring has a width between about 0.095 inch and about 0.115 inch.

7. The helmet mount as in claim 1, wherein the front plate and the back plate are slidably connected by a double dovetail interface.

8. The helmet mount as in claim 7, where the double dovetail interface has sidewalls angles at about 15 degrees from the vertical.

9. The helmet mount as in claim 1 further comprising a sliding cover plate, the sliding cover plate slidably connected to the front plate and the back plate to prevent foreign objects from entering the gear drive system.

10. A helmet mount for a night vision device comprising:
    a helmet block;
    a chassis attached to the helmet block, the chassis adapted to receive the night vision device; and
    a vertical adjustment assembly for vertically adjusting the night vision device relative to the user's eyes while the helmet mount is secured to the helmet and the night vision device is received in the helmet mount, the vertical adjustment assembly including:
       a front plate and a back plate that are slidably connected, wherein the front plate is coupled to the chassis and the back plate is coupled to the helmet mount; and
       a gear drive system having a lever positioned adjacent to a front surface of the front plate and a gear positioned within a back surface of the back plate, wherein rotating the lever rotates the gear so that the vertical position of the chassis is changed relative to the helmet block;
       the gear driven system further comprising a tapered shaft connected to the lever.

11. The helmet mount as in claim 10 further comprising a tapered receptacle adapted to receive the tapered shaft.

12. The helmet mount as in claim 11 further comprising a biasing means to bias the tapered shaft and the tapered receptacle in tension.

13. The helmet mount as in claim 12, wherein the biasing means is a coil spring.

14. A helmet mount for a night vision device comprising:
a helmet block;
means for mounting the helmet block to a helmet;
a chassis;
means for mounting the night vision device to the chassis;
means for slidably attaching the chassis to the helmet block;
means for vertically adjusting the means for slidably attaching the chassis to the helmet block; and
means for biasing the means for slidably attaching the chassis to the helmet block in tension, the means for biasing adapted to permit sliding between the chassis and the helmet block at any point of engagement.

15. The helmet mount of claim 14, wherein the means for biasing is a leaf spring.

16. The helmet mount of claim 14, further comprising a tapered shaft and wherein the means for biasing is a coil spring.

* * * * *